United States Patent
Arai et al.

(10) Patent No.: US 7,754,254 B2
(45) Date of Patent: Jul. 13, 2010

(54) METHOD FOR PROVIDING COATED PRODUCT

(75) Inventors: Sho Arai, Moriguchi (JP); Shoko Sakai, Kobe (JP); Nao Imanishi, Hirakata (JP)

(73) Assignee: Ueno Fine Chemicals Industry, Ltd., Osaka-shi (JP)

( * ) Notice: Subject to any disclaimer, the term of this patent is extended or adjusted under 35 U.S.C. 154(b) by 900 days.

(21) Appl. No.: 11/451,447

(22) Filed: Jun. 13, 2006

(65) Prior Publication Data
US 2006/0286204 A1 Dec. 21, 2006

(30) Foreign Application Priority Data
Jun. 14, 2005 (JP) ............................. 2005-173894

(51) Int. Cl.
*A23G 3/00* (2006.01)
*A23G 3/30* (2006.01)

(52) U.S. Cl. ..................... 426/5; 424/488; 424/475; 424/440; 426/3; 426/103; 426/302; 426/660

(58) Field of Classification Search ............... None
See application file for complete search history.

(56) References Cited

U.S. PATENT DOCUMENTS

| | | | | |
|---|---|---|---|---|
| 4,840,797 A | * | 6/1989 | Boursier | 424/475 |
| 4,849,023 A | * | 7/1989 | Devos et al. | 127/40 |
| 5,527,542 A | * | 6/1996 | Serpelloni et al. | 424/488 |
| 5,583,215 A | * | 12/1996 | Kawashima et al. | 536/127 |
| 5,873,943 A | * | 2/1999 | Magara et al. | 127/29 |
| 7,108,885 B2 | * | 9/2006 | Serpelloni | 426/548 |
| 2001/0021403 A1 | | 9/2001 | Zyck et al. | |
| 2003/0190397 A1 | | 10/2003 | Serpelloni | |
| 2004/0166231 A1 | * | 8/2004 | Ortiz De Zaratte et al. | 427/2.14 |

FOREIGN PATENT DOCUMENTS

| | | |
|---|---|---|
| EP | 1 350 436 A1 | 10/2003 |
| EP | 1 350 436 B1 | 5/2005 |
| WO | WO 97/01962 A1 | 1/1997 |
| WO | WO 01/95738 A1 | 12/2001 |
| WO | WO 02/051260 A1 | 7/2002 |
| WO | 03/000068 A1 | 1/2003 |
| WO | WO 03/092400 A1 | 11/2003 |

\* cited by examiner

*Primary Examiner*—Jennifer C McNeil
*Assistant Examiner*—Hong Mehta
(74) *Attorney, Agent, or Firm*—Sughrue Mion, PLLC

(57) ABSTRACT

The present invention provides a method for providing a coating comprising maltitol which can prevent the coating from being chipped without using reinforcement or binder at low cost and at short times. The present invention provides a method for providing a coating for a core material, which comprises: (i) a first coating step which comprises coating the core material with an aqueous solution comprising maltitol and a crystallization inhibitor which inhibits crystallization of maltitol in an amount more than 3% by weight and not more than 6% by weight based on the weight of total solid content of sugar alcohols including maltitol in the solution, (ii) a second coating step which comprises coating the core material which has been coated by the first coating step with a powder maltitol composition, and (iii) a drying step which comprises drying the thus coated core material.

11 Claims, No Drawings

METHOD FOR PROVIDING COATED PRODUCT

TECHNICAL FIELD

The present invention relates to a method for providing a coated product, wherein the coating comprises maltitol as its major component as well as a product with coating obtainable by said method.

BACKGROUND ART

Maltitol, one of sugar alcohols, is a low-calorie sweetener which exhibits sweet taste like sucrose and is used for various products. These days, the use of maltitol in coatings of tabletted chewing gum, pills and the like has been increasing.

In general, there are two types of methods to apply coatings. One is a hard coating method which comprises repeating the steps of coating a core material with a sugar solution and drying the coated core material. The other is a soft coating method which comprises repeating the steps of coating a core material with a sugar solution, further coating the core material with powders of the sugar and drying the coated core material. Currently, the hard coating method predominates.

Maltitol is also used for coating. The hard coating method which comprises repeating the steps of coating a core material with highly pure aqueous maltitol solution and drying the coated core material has been employed. This method can provide a smooth coating, but thus coated layer tends to be chipped during its processing and it takes a long time to complete the coating.

WO2003/000068 proposes to add a binder to the coating syrup. The use of binders seems to be effective in preventing the coating from being chipped but it is expensive. The coating procedure of the patent also takes a long time. In addition, hard coating method requires maltitol with high-purity.

DISCLOSURE OF THE INVENTION

An object of the present invention is to provide a method for providing a maltitol-containing coating to a core material which is resistant to chipping at low cost in short time.

Another object of the present invention is to provide a product with maltitol-containing coating obtainable by said method.

The present inventors have found that coating layer which is resistant to chipping can be obtained effectively by coating a core material with aqueous maltitol solution containing a certain amount of crystallization inhibitor which inhibits crystallization of maltitol and further coating thus coated core material with a powder maltitol composition, and have completed the invention.

The present invention provides a method for providing a coating for a core material, which comprises:
(i) a first coating step which comprises coating the core material with an aqueous solution comprising maltitol and a crystallization inhibitor which inhibits crystallization of maltitol in an amount more than 3% by weight and not more than 6% by weight based on the weight of total solid content of sugar alcohols including maltitol in the solution,
(ii) a second coating step which comprises coating the core material which has been coated by the first coating step with a powder maltitol composition, and
(iii) a drying step which comprises drying thus coated core material.

The present invention also provides a coated product obtainable by said method.

In the specification and claims of the present application, "aqueous solution comprising maltitol and a crystallization inhibitor which inhibits crystallization of maltitol" used in the first coating step is a solution of a sugar alcohol composition which comprises maltitol as its major component and a crystallization inhibitor. The sugar alcohol composition may optionally comprise sorbitol. The aqueous solution used in the first coating step may further comprise components which are known to be admixed with coatings such as binder, colorant, flavoring and the like.

In the specification and claims of the present application, "powder maltitol composition" used in the second coating step is a sugar alcohol composition which comprises powdery maltitol as its major component and may optionally comprise sugar alcohols other than maltitol. The powder maltitol composition may further comprise components which are known to be admixed with coatings such as colorant, flavoring and the like.

Examples of crystallization inhibitors which inhibit crystallization of maltitol contained in the aqueous maltitol solution used in the first coating step include sugar alcohol whose polymerization degree is 3 or more, sucrose, starch syrup and the like. Among them, the sugar alcohol with polymerization degree of 3 or more is preferable and that with polymerization degree of 3 to 5 is more preferable. Examples of the sugar alcohols with polymerization degree of 3 or more include maltotriitol, maltotetraitol, isomaltotetraitol and the like. The crystallization inhibitor may consist of one or more components.

The content of the crystallization inhibitor is more than 3% by weight and not more than 6% by weight, and is preferably 4 to 5% by weight based on the total solid content of sugar alcohols including maltitol in the solution. By using such amount of the crystallization inhibitor in the first step, the adhesion efficiency of powders in the second coating step is increased. When the content of the crystallization inhibitor is 3% by weight or less, the inhibition of the crystallization of maltitol may not be sufficient and may cause occurrence of crystallization of maltitol prior to the second coating step, which makes the coating with the powder composition in the second coating step inefficient. On the other hand, when the content of the crystallization inhibitor is more than 6% by weight, the crystallization of maltitol may not accelerate in the second coating step and the resulting coating may have insufficient mechanical strength.

The aqueous solution used in the first coating step of comprises sugar alcohol composition which may comprise preferably 80-97% by weight, more preferably 82-92% by weight of maltitol based on the total solid content of sugar alcohols including maltitol in the solution. In addition, the sugar alcohol composition may comprise preferably 5-12% by weight, more preferably 6-10% by weight of sorbitol based on the total solid content of sugar alcohols including maltitol in the solution.

The concentration of the sugar alcohol composition in the solution used in the first coating step is not limited and may preferably be a high concentration such as that equals to or near the saturating concentration of maltitol at the temperature of the solution.

The amount of the solution used in the first coating step may depend on the size or the amount of the core material, and may be the amount which can cover the surfaces of all core material. For example, when the core material is commercially available chewing gum tablets, the amount of the solution may be 10 to 20 ml per one kilogram of the core tablets.

The temperature of the solution used in the first coating step may preferably be 10-60° C. and more preferably 20-40° C.

The powder maltitol composition used in the second coating step may be the same sugar alcohol composition contained in the solution used in the first coating step. The powder maltitol composition may have maltitol with higher purity than that contained in the solution used in the first coating step. For example, the powder maltitol composition used in the second coating step may be commercially available crystalline maltitol. The maltitol purity of the powder maltitol composition may be preferably 88-100% by weight and more preferably 88-98% by weight.

The size of the particles contained in the powder maltitol composition is not limited, and in view of providing smooth surface, it may preferably be not more than 300 μm and more preferably 1-295 μm.

After the second coating step is completed, the core material with coating is subjected to the drying step. The method for drying the coated core material is not limited, and the method which comprises blowing air onto the coated core material with stirring the same is preferable. The drying step may preferably be conducted at a temperature of 10-60° C. and more preferably 20-40° C.

The device used for the coating method of the present invention is not limited as long as the core material in the device can be stirred. Examples of the devices include onion-shaped or conical-shaped coating pan as well as air blow coating device.

In the method of the present invention, a cycle which consists of the above-described first coating step, second coating step and drying step is repeated multiple times until the product with desired coating layer is obtained. The number of cycles may depend on the size and the amount of the core material as well as the intended thickness of the coating layer. In general, the above-described steps (i) to (iii) are repeated until the ratio of the coating to the pore material reaches 10-200%, preferably 20-100% in order to obtain products with the coatings resistant to chipping.

In the present specification and claims, "ratio of the coating to the core material" refers to the ratio calculated according to the formula 1 below:

Ratio of the coating to the core material (%)=(weight of 100 tablets of products with coating−weight of 100 tablets of core material)/ (weight of 100 tablets of core material)×100   [Formula 1]

The method of the present invention may further comprise coating thus coated core material with an aqueous maltitol solution after the above-described cycles are completed and then drying the coated material in order to make the outer surface of the coating layer more smooth. The aqueous maltitol solution used for this additional coating step may preferably contain 97-99.9% by weight of maltitol based on total solid content of sugar alcohols including maltitol in the solution. This additional step may be effective to make the coating smooth and give the crunchy texture to the final product.

The aqueous maltitol solution used in this additional coating step may further comprise binder, colorant, flavoring and the like.

The colorant and flavoring may be added in any step of the present method, but they are preferably used in the additional, i.e., the final coating step.

The product with coating obtained by the method of the present invention may have a coating layer which is resistant to chipping. In particular, the product obtained by the method which comprises the above-described additional coating step may have the coating layer which is resistant to chipping.

The product with coating of the present invention may preferably have a degree of friability of 0.01-0.5% and more preferably that of 0.01-0.3%.

In the specification and claims, "degree of friability" refers to a percentage calculated according to formula 2 below:

Degree of friability (%)=(initial weight of 10 tablets of the coated products−weight of 10 tablets of the coated products after the products was treated in the tablet friabilator)/ (initial weight of 10 tablets of the coated products)×100   [Formula 2]

<Method for Determining Degree of Friability>

Firstly, the initial weight of 10 tablets of the coated products is determined and the coated products are fed in a tablet friabilator (FRIABILATOR TFT-120, Toyama Sangyo Co., Ltd., Osaka, Japan) and the tablet friabilator is rotated 100 times at an angle of inclination of 10° and a spin speed of 25 rpm. Ten tablets of the coated products are took out and weighed and the degree of friability of them is calculated by the above formula 2.

The method of the present invention can be suitably applied to chewing gum, pills, candy, chocolate and the like.

EXAMPLES

The present invention is further described in reference to the following examples. The following examples are intended to illustrate the invention and are not to be construed to limit the scope of the invention.

Example 1

<Test Method>

One kilogram of core tablets (Xylitol Gum Lime Mint, LOTTE Co., Ltd., Tokyo, Japan) were fed in a coating pan (Mini coating pan, outer diameter (mm)/inner diameter (mm)/depth (mm): 350/200/277, capacity: 5 kg, angle of inclination: 28°, OSA MACHINERY Co., Ltd., Kanagawa, Japan) and the pan was rotated at 30-40 rpm. To the coating pan, 15 g of the coating solution containing sugar alcohol composition shown in Table 1 was fed and the first coating step was carried out until all the surfaces of core tablets had been contacted with the coating solution. Thereafter, 23 g of the coating powder which consists of same sugar alcohol composition as contained in the coating solution was fed in the coating pan and the second coating step was carried out by stirring the mixture until all the surfaces of core tablets had been contacted with the coating powders. The drying step was then carried out by blowing air whose temperature was about 25° C. into the coating pan for 10 minutes.

The above described procedure was repeated until the ratio of the coating to the core material calculated by formula 1 reached 25%.

<Result>

The coating efficiency of thus obtained products with coatings is calculated by formula 3 below.

Coating efficiency (%/hr)=(ratio of the coating to the core material)/ (time for coating) ×100   [Formula 3]

The result is shown in Table 3. The coating efficiency achieved by this Example was significantly higher than those achieved by Comparative examples.

Example 2

<Test Method>
Products with coatings were produced by the same manner as Example 1 except that the sugar alcohol composition in the coating solution or of the coating powder was changed to that shown in Table 1 and the coating condition was changed to that shown in Table 2.

<Result>
The coating efficiency was calculated by formula 3 and the result is shown in Table 3. The coating efficiency achieved by this Example was higher than those achieved by Comparative examples.

Comparative Example 1

<Test Method>
Products with coatings were produced by the same manner as Example 1 except that the sugar alcohol composition in the coating solution or of the coating powder was changed to that shown in Table 1 and the coating condition was changed to that shown in Table 2.

<Result>
The coating efficiency was calculated by formula 3 and the result is shown in Table 3. The coating efficiency achieved by Comparative example 1 was lower than those achieved by Examples 1 and 2.

Comparative Example 2

<Test Method>
Products with coatings were produced by the same manner as Example 1 except that the sugar alcohol composition in the coating solution was changed to that shown in Table 1, the coating condition was changed to that shown in Table 2 and the second coating step using powder composition was omitted.

<Result>
The coatings of the products obtained by Comparative example 2 were markedly chipped during the coating.

Comparative Example 3

<Test Method>
Products with coatings were produced by the same manner as Example 1 except that the sugar alcohol composition in the coating solution was changed to that shown in Table 1, the coating condition was changed to that shown in Table 2 and the second coating step using powder composition was omitted.

<Result>
The coating efficiency was calculated by formula 3 and the result is shown in Table 3. The coating efficiency achieved by Comparative example 3 was extremely lower than those achieved by Examples 1 and 2.

Comparative Example 4

Products with coatings were produced by the same manner as Example 1 except that the sugar alcohol composition in the coating solution or of the coating powder was changed to that shown in Table 1 and the coating condition was changed to that shown in Table 2.

<Result>
The coating efficiency was calculated by formula 3 and the result is shown in Table 3. The coating efficiency achieved by Comparative example 4 was lower than those achieved by Examples 1 and 2.

TABLE 1

Composition of coating

Sugar alcohol composition in the coating solution/coating powder (% by weight in solid content of sugar alcohol)

| | Sorbitol | Maltitol | Sugar alcohol with polymerization degree of 3 or more | Content of gum arabic (% by weight) | Solid content in coating solution (% by weight) | Particle size of coating powder (μm) |
|---|---|---|---|---|---|---|
| Example 1 | 6 | 90 | 4 | 0 | 60 | 140 |
| Example 2 | 1 | 95 | 4 | 0 | 60 | 140 |
| Com. Ex. 1 | 5 | 95 | 0 | 0 | 60 | 140 |
| Com. Ex. 2 | 0 | 100 | 0 | 1 | 60 | — |
| Com. Ex. 3 | 0 | 100 | 0 | 3 | 60 | — |
| Com. Ex. 4 | 0 | 100 | 0 | 3 | 60 | 140 |

TABLE 2

Condition of coating

| | Amount of coating solution per one cycle (g) | Amount of coating powder per one cycle (g) | Time of air flow (min) |
|---|---|---|---|
| Example 1 | 15 | 23 | 10 |
| Example 2 | 15 | 15 | 10 |
| Com. Ex. 1 | 9 | 10 | 10 |
| Com. Ex. 2 | 8 | — | 10 |
| Com. Ex. 3 | 8 | — | 10 |
| Com. Ex. 4 | 11 | 12 | 10 |

One cycle is consisting of a first coating step, a second coating step and a drying step.

TABLE 3

Result of coating

| | Ratio of the coating to the core material (%) | Coating time (hr) | Coating efficiency (%/hr) |
|---|---|---|---|
| Example 1 | 25.0 | 3.2 | 7.8 |
| Example 2 | 25.0 | 4.7 | 5.3 |
| Com. Ex. 1 | 25.8 | 6.0 | 4.3 |
| Com. Ex. 2 | — | — | — |
| Com. Ex. 3 | 25.0 | 20.8 | 1.2 |
| Com. Ex. 4 | 25.1 | 6.3 | 4.0 |

Example 3

<Test Method>
Products with coatings were produced by the same manner as Example 1 except that after the ratio of the coating to the core material had reached 19%, the coated core material were further coated by the same manner as Comparative example 3 until the final ratio of the coating to the core material reached 25%. The degree of friability of thus obtained products with coatings was calculated by formula 2. As a control, the degree of friability of the products obtained by Comparative example 3 was calculated.

<Result>

The result is shown in Table 4. The degree of friability of products with coatings obtained by this example was significantly lower than that of Comparative example 3. It was confirmed that the method of the present invention could provide products with coatings which were resistant to chipping.

TABLE 4

| | Result | | | |
|---|---|---|---|---|
| | Ratio of the coating to the core material (%) | Initial weight (g) | Weight after abrasive process (g) | Degree of friability (%) |
| Example 3 | 25.0 | 18.27 | 18.25 | 0.11 |
| Com. Ex. 3 | 25.0 | 18.43 | 18.39 | 0.22 |

What is claimed is:

1. A method for providing a coating for a core material, which comprises:
   (i) a first coating step which comprises coating the core material with an aqueous solution comprising 82-92 wt % of maltitol, 5-12 wt % of sorbitol and a sugar alcohol having a polymerization degree of 3 or more in an amount more than 3% by weight and not more than 6% by weight based on the weight of total solid content of sugar alcohols including maltitol in the solution,
   (ii) a second coating step which comprises coating the core material which has been coated by the first coating step with a powder maltitol composition, and
   (iii) a drying step which comprises drying thus coated core material.

2. The method according to claim 1, wherein the size of the particles contained in said powder maltitol composition is 1-295 μm.

3. The method according to claim 1, which comprises repeating the steps (i) to (iii) until the ratio of the coating to the core material reaches 10% or more.

4. A product with coating obtainable by the method according to claim 3, wherein the degree of friability of the product is 0.01 to 0.5%.

5. The product with coating according to claim 4, which is chewing gum.

6. The method according to claim 3, further comprising coating said coated core material with an aqueous maltitol solution which contains 97-99.9% by weight of maltitol based on total solid content of sugar alcohols including maltitol in the solution after repeating the steps (i) to (iii) is completed.

7. A product with coating obtainable by the method according to claim 6, wherein the degree of friability of the product is 0.01 to 0.5%.

8. The product with coating according to claim 7, which is chewing gum.

9. The method according to claim 1, wherein the aqueous solution used in the step (i) comprises 4-5 wt % of the sugar alcohol having polymerization degree of 3 or more.

10. The method according to claim 1, wherein the aqueous solution used in the step (i) comprises 6-10 wt % of sorbitol.

11. The method according to claim 1, wherein the powder maltitol composition used in the step (ii) has the same sugar alcohol composition as contained in the aqueous solution used in the step (i).

* * * * *